United States Patent
Asano

(10) Patent No.: US 9,915,997 B2
(45) Date of Patent: Mar. 13, 2018

(54) ELECTRONIC DEVICE, POWER CONTROL METHOD AND STORAGE MEDIUM STORING PROGRAM THEREOF

(71) Applicant: CANON KABUSHIKI KAISHA, Tokyo (JP)

(72) Inventor: Kohei Asano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 14/203,148

(22) Filed: Mar. 10, 2014

(65) Prior Publication Data

US 2014/0281631 A1    Sep. 18, 2014

(30) Foreign Application Priority Data

Mar. 18, 2013 (JP) ................................. 2013-055418

(51) Int. Cl.
*G06F 1/32* (2006.01)

(52) U.S. Cl.
CPC ............ *G06F 1/3231* (2013.01); *G06F 1/325* (2013.01); *G06F 1/3287* (2013.01); *Y02B 60/1282* (2013.01); *Y02B 60/1289* (2013.01)

(58) Field of Classification Search
CPC ....... G06F 1/325; G06F 1/3231; G06F 1/3287
See application file for complete search history.

(56) References Cited

U.S. PATENT DOCUMENTS

| 7,190,636 | B1 * | 3/2007 | Depaola | ............. | H04B 10/1143 |
| | | | | | 367/131 |
| 7,255,466 | B2 * | 8/2007 | Schmidt | ............... | G07C 9/0069 |
| | | | | | 200/314 |
| 7,605,841 | B2 * | 10/2009 | Kondo | .................... | G05B 15/02 |
| | | | | | 348/143 |
| 8,560,004 | B1 * | 10/2013 | Tsvetkov | ................ | H04M 1/67 |
| | | | | | 310/328 |
| 9,159,208 | B2 * | 10/2015 | Gritti | ..................... | G08B 13/00 |
| 9,386,522 | B2 * | 7/2016 | San Vicente | ......... | A61B 5/0015 |
| 2003/0137394 | A1 * | 7/2003 | Romero Herrera | .... | G05G 9/047 |
| | | | | | 338/32 H |
| 2004/0263323 | A1 * | 12/2004 | Seike | .................. | B60R 25/1004 |
| | | | | | 340/426.1 |

(Continued)

FOREIGN PATENT DOCUMENTS

CN      1652653 A     8/2005
CN    102480579 A     5/2012

(Continued)

OTHER PUBLICATIONS

Chinese Office Action dated Jul. 4, 2016 in Chinese Application No. 201410090612.4.

*Primary Examiner* — Thomas Lee
*Assistant Examiner* — Mohammad A Rahman
(74) *Attorney, Agent, or Firm* — Fitzpatrick, Cella, Harper & Scinto

(57) ABSTRACT

In an electronic device, a first sensor detects a detection target on a first region. A second sensor detects a detection target on a second region. A third sensor detects a detection target on a third region. A power control unit turns on the second sensor in a case where the first sensor detects the detection target on the first region. The power control unit turns on the third sensor and turns off the first sensor in a case where the second sensor detects the detection target on the second region.

19 Claims, 13 Drawing Sheets

(56) References Cited

U.S. PATENT DOCUMENTS

| | | | | |
|---|---|---|---|---|
| 2005/0029459 A1* | 2/2005 | Gotz | ............... | G01J 5/0022 |
| | | | | 250/353 |
| 2011/0181289 A1* | 7/2011 | Rushing | ............ | G01V 3/081 |
| | | | | 324/326 |
| 2011/0312349 A1* | 12/2011 | Forutanpour | ......... | G06F 1/1626 |
| | | | | 455/466 |
| 2012/0105193 A1 | 5/2012 | Gritti | | |
| 2014/0006830 A1* | 1/2014 | Kamhi | ............ | G06F 1/3287 |
| | | | | 713/324 |
| 2015/0138801 A1* | 5/2015 | Salter | ............ | B60Q 3/0209 |
| | | | | 362/510 |

FOREIGN PATENT DOCUMENTS

| | | |
|---|---|---|
| CN | 102480580 A | 5/2012 |
| CN | 202600394 U | 12/2012 |
| JP | 2012-87962 A | 5/2012 |

\* cited by examiner

FIG. 6

| | | POSITION OF DETECTION TARGET | | | |
|---|---|---|---|---|---|
| | | POINT A | FIRST SENSOR DETECTION REGION | INTERMEDIATE SENSOR DETECTION REGION | FINAL SENSOR DETECTION REGION | ON SYSTEM |
| POWER SOURCE STATES OF SENSORS | FIRST SENSOR | ON | ON | OFF | OFF | OFF |
| | INTERMEDIATE SENSOR | OFF | ON | ON | ON | OFF |
| | FINAL SENSOR | OFF | OFF | ON | ON | ON |
| | CONTROLLER | OFF | OFF | OFF | ON | ON |

F I G. 7
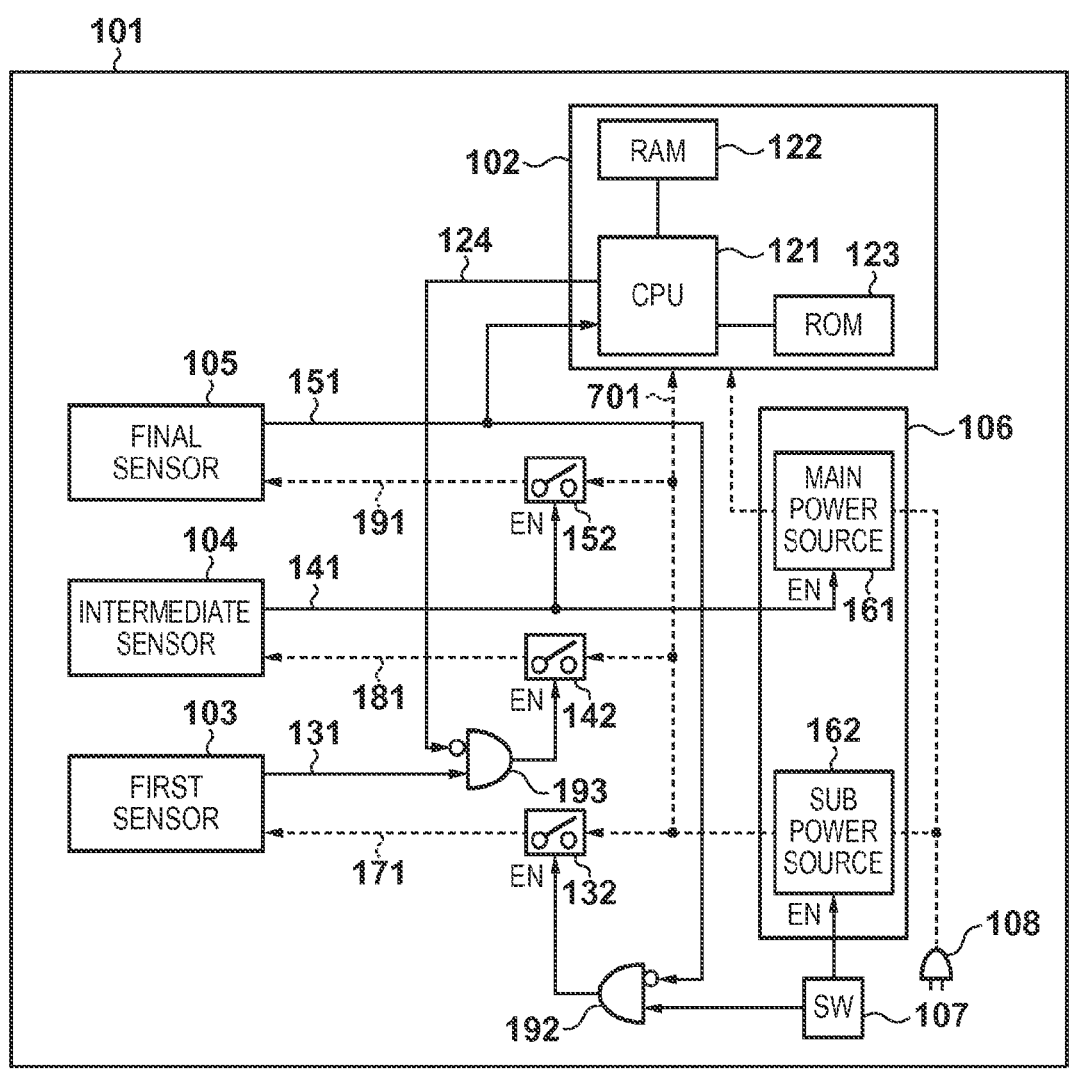

F I G. 10

| | | POSITION OF DETECTION TARGET | | | | |
|---|---|---|---|---|---|---|
| | | POINT A | FIRST SENSOR DETECTION REGION | INTERMEDIATE SENSOR DETECTION REGION | FINAL SENSOR DETECTION REGION | ON SYSTEM |
| POWER SOURCE STATES OF SENSORS | FIRST SENSOR | ON | ON | OFF | OFF | OFF |
| | INTERMEDIATE SENSOR | OFF | ON | ON | ON | OFF |
| | FINAL SENSOR | OFF | OFF | ON | ON | ON |
| | CONTROLLER | POWER SAVING | POWER SAVING | NORMAL | NORMAL | NORMAL |

ELECTRONIC DEVICE, POWER CONTROL METHOD AND STORAGE MEDIUM STORING PROGRAM THEREOF

BACKGROUND OF THE INVENTION

Field of the Invention

The present invention relates to an electronic device having a plurality of sensors used to detect movement of an external detection target, a power control method, and a storage medium storing a program thereof.

Description of the Related Art

A detection system which detects a change in sensing target as a time series using a plurality of sensors is known. For example, two infrared sensors which detect the presence of a heat source such as a person are prepared at points A and B, and detection times of the sensors at the points A and B are overlaid to detect movement of a person as a detection target from the point A to the point B. In this arrangement, as the number and types of sensors are increased, detection can be made at higher precision.

Japanese Patent Laid-Open No. 2012-087962 describes an arrangement which combines a sensor which can detect a broad range at a low resolution, and a sensor which can detect a narrow range at a high resolution. In this arrangement, after an access of a person is detected by the former sensor, an azimuth direction in which the person exists practically is detected using the latter sensor, the azimuth direction in which the person exists can be precisely detected using a small number of sensors.

In general, to a sensor, a power supply line for the sensor and a detection signal line used to notify a CPU or the like of detection are connected. As the number of sensors in a system increases, the number of detection signal lines is also increased, thus consuming I/O ports of the CPU as the notification destination. Also, total power consumption consumed by the sensors in the whole system is also increased. However, even when power supply lines are configured to power only required sensors, these power supply lines further unwantedly consume I/O ports of the CPU.

However, in the power control arrangement required to power only required sensors, the CPU has to always be in an operating state. Therefore, when the power consumption of the CPU is large, electric power which can be reduced by turning off a power source of unnecessary sensors by the power control may be canceled out. Also, even when the power control is configured to be executed via a dedicated IC (integrated circuit) or encoder/decoder in place of the CPU, the detection system is more complicated.

SUMMARY OF THE INVENTION

An aspect of the present invention is to eliminate the above-mentioned problems with the conventional technology. The present invention provides an electronic device which detects a detection target using a plurality of sensors and reduces power consumption, a power control method, and a storage medium storing a program thereof.

The present invention in a first aspect provides an electronic device comprising: a first sensor configured to detect a detection target on a first region; a second sensor configured to detect a detection target on a second region; a third sensor configured to detect a detection target on a third region; and a power control unit configured to turn on the second sensor in a case where the first sensor detects the detection target on the first region, and configured to turn on the third sensor and to turn off the first sensor in a case where the second sensor detects the detection target on the second region.

The present invention in a second aspect provides a power control method executed in an electronic device, which has a first sensor configured to detect a detection target on a first region, a second sensor configured to detect a detection target on a second region, and a third sensor configured to detect a detection target on a third region, the method comprising: turning on the second sensor in a case where the first sensor detects the detection target on the first region; and turning on the third sensor and turning off the first sensor in a case where the second sensor detects the detection target on the second region.

The present invention in a third aspect provides a computer-readable medium that stores therein a program of a power control method executed in an electronic device, which has a first sensor configured to detect a detection target on a first region, a second sensor configured to detect a detection target on a second region, and a third sensor configured to detect a detection target on a third region, the program for causing a computer to: turn on the second sensor in a case where the first sensor detects the detection target on the first region; and turn on the third sensor and turning off the first sensor in a case where the second sensor detects the detection target on the second region.

According to the present invention, power consumption can be reduced in the electronic device which detects a detection target using a plurality of sensors.

Further features of the present invention will become apparent from the following description of exemplary embodiments with reference to the attached drawings.

BRIEF DESCRIPTION OF THE DRAWINGS

FIG. 6 is a table showing power ON/OFF states of respective units according to positions of a person;

FIG. 7 is a block diagram showing the arrangement of a detection system according to the second embodiment;

FIG. 10 is a table showing power ON/OFF states of respective units according to positions of a person.

DESCRIPTION OF THE EMBODIMENTS

Figure 1:
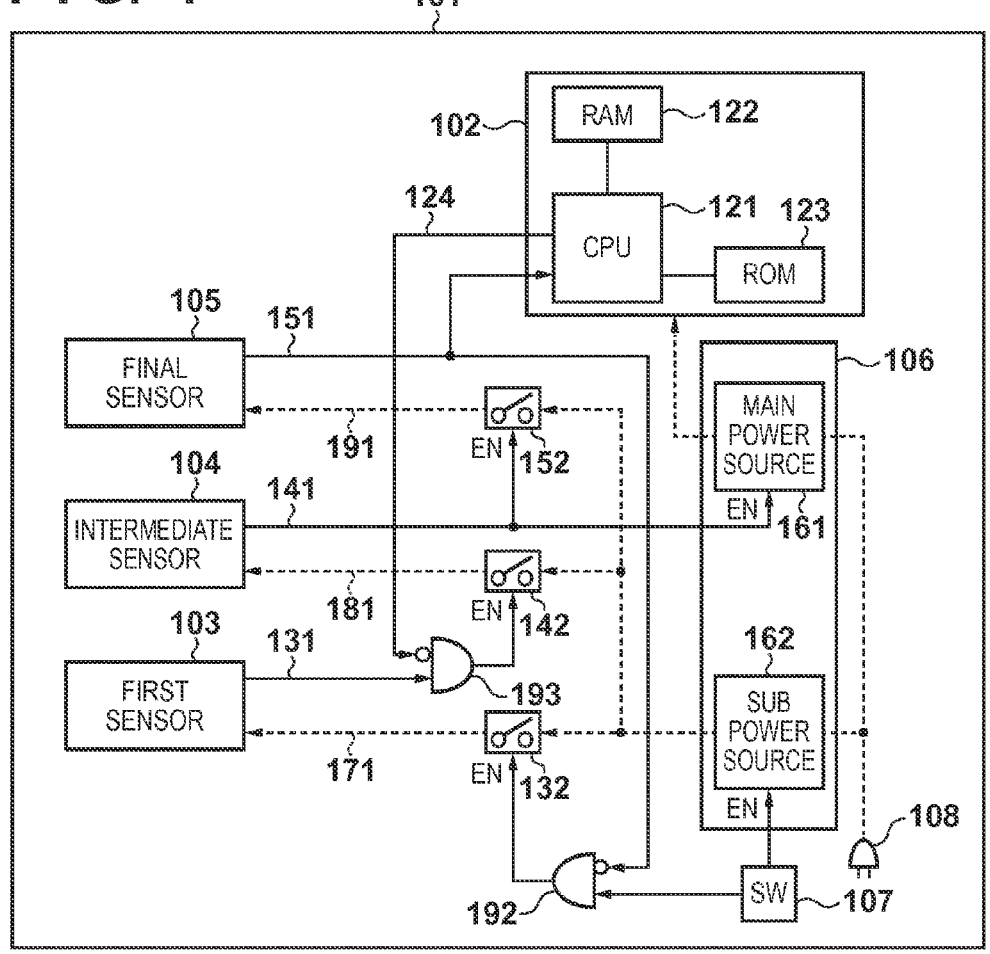
FIG. 1 is a block diagram showing the arrangement of a detection system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a description thereof will not be repeated.

First Embodiment

FIG. 1 is a block diagram showing the arrangement of a detection system 101 which can detect movement of a detection target such as a person outside a device using a plurality of sensors. In this embodiment, a detection system 101 is mounted in an image processing apparatus represented by a printer, scanner, or MFP which integrates these plurality of functions. The image processing apparatus will also be simply referred to as an electronic device hereinafter as a device including the detection system 101. The detection system 101 includes a controller 102, three types of sensors, that is, first sensor 103, second sensor (intermediate sensor) 104, and third sensor (final sensor) 105, power source unit 106, main switch 107, and AC outlet 108. The controller 102 includes a CPU 121, a RAM 122 which is used as a temporary storage by the CPU 121, and a ROM 123 which stores various programs executed by the CPU 121. When a power source of the CPU 121 is turned on, the CPU 121 loads programs from the ROM 123 onto the RAM 122 to implement functions of the image processing apparatus which mounts the detection system 101. The image processing apparatus can resume from a power saving mode to a normal mode when it detects an access of a person by the detection system 101, and can set the power saving mode upon detection of the absence of a person. The sensors used in this embodiment are those which can detect the presence of a detection target such as an external person, and may include, for example, an infrared sensor and pyroelectric sensor. Since the respective sensors have different detection regions, movement of the detection target, that is, whether or not the detection target comes closer to or moves away from the image processing apparatus can be detected. The detection regions of the sensors will be described later with reference to FIG. 3.

To the first sensor 103, a detection signal line 131 and sensor power supply line 171 are connected. To the intermediate sensor 104, a detection signal line 141 and sensor power supply line 181 are connected. To the final sensor 105, a detection signal line 151 and sensor power supply line 191 are connected. Note that the detection signal lines 131, 141, and 151 are connected to detection signal output terminals of the corresponding sensors. Also, the sensor power supply lines 171, 181, and 191 are connected to power source terminals of the corresponding sensors. The sensor power supply lines 171, 181, and 191 are respectively connected to output terminals of sensor power source relays 132, 142, and 152 required to open/close switches used to supply electric power.

The detection signal line 131 is connected to an input terminal of an AND circuit 193. Also, a sensor power control line 124 from the CPU 121 is connected to an inverting input terminal of the AND circuit 193. An output terminal of the AND circuit 193 is connected to an enable terminal of the sensor power source relay 142. The detection signal line 141 is connected to an enable terminal of the sensor power source relay 152 and that of a main power source 161 in a power source unit 106. The detection signal line 151 is connected to a reset terminal of the CPU 121, and is also connected to an inverting input terminal of an AND circuit 192. An output signal line of the main switch 107 as a main power source switch of the detection system 101 is connected to an input terminal of the AND circuit 192, and an output terminal of the AND circuit 192 is connected to an enable terminal of the sensor power source relay 132. Statuses of detection signals output from the sensors 103 to 105 onto the detection signal line and a status of the sensor power control line 124 output from the CPU 121 are latched by latch circuits (not shown) in respective devices independently of power source statuses of the respective devices.

The power source unit 106 includes the main power source 161 and a sub power source 162. The main power source 161 is, for example, an AC/DC converter power source module, which generates electric power for the controller 102, and a power supply line is connected to the controller 102. Also, as described above, to the enable terminal of the main power source 161, the detection signal line 141 from the intermediate sensor 104 is connected. When the enable terminal of the main power source 161 is activated, the main power source 161 can supply electric power to the controller 102.

The sub power source 162 is, for example, an AC/DC converter power source module, which generates electric power to be supplied to the respective sensors. A power supply line of the sub power source 162 is connected to the sensor power source relays 132, 142, and 152. When an enable terminal of the sub power source 162 is activated, the sub power source 162 can supply electric power to the sensor power source relays 132, 142, and 152. The output signal line of the main switch 107 is also connected to the enable terminal of the sub power source 162. When the main switch 107 is turned on, the enable terminal of the sub power source 162 is activated. When the enable terminals of the sensor power source relays 132, 142, and 152 are activated, the electric power supplied from the sub power source 162 can be further supplied to the corresponding sensors 103 to 105. The AC outlet 108 supplies AC electric power to the main power source 161 and sub power source 162. In a normal operation mode in which electric power is supplied to respective units of the image processing apparatus which mounts the detection system 101, the enable terminal of the main power source 161 is active. Also, in a power saving mode in which power supply in the image processing apparatus is limited compared to the normal operation mode, the enable terminal of the main power source 161 is inactive, and the enable terminal of the sub power source 162 is active.

Figure 2:
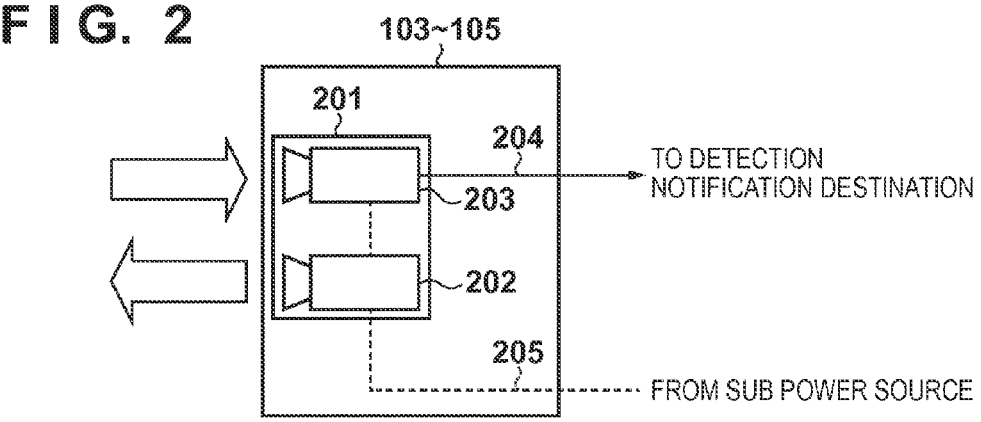
FIG. 2 is a view showing the internal arrangement of each sensor.

FIG. 2 shows the internal arrangement of the sensors 103 to 105. Each of the sensors 103 to 105 includes a detection unit 201 including a light-emitting unit 202 and light-receiving unit 203, a detection signal line 204, and a power supply line 205. In this case, the detection signal line 204 corresponds to the detection signal lines 131, 141, and 151 shown in FIG. 1. Also, the power supply line 205 corresponds to the power supply lines 171, 181, and 191 shown in FIG. 1. The light-emitting unit 202 includes an infrared LED, and radiates infrared rays. The light-receiving unit 203 detects infrared rays. When a detection target such as a person exists within a detection range of the sensor, infrared rays radiated from the light-emitting unit 202 are reflected by the detection target, and the light-receiving unit 203 detects the reflected infrared rays. Upon detection of the reflected infrared rays, the light-receiving unit 203 activates the detection signal line 204. With this arrangement, each of the sensors 103 to 105 can notify a unit outside the sensor of detection of the detection target via the detection signal line 204. The power supply line 205 connected to the detection unit 201 is connected to the light-emitting unit 202 and light-receiving unit 203, and the detection unit 201 operates when electric power is supplied from the power supply line 205.

The power control processing of the respective sensors in the detection system 101 will be described below with reference to FIGS. 1, 3, 4A, 4B, 5A, 5B, and 6.

Figure 3:
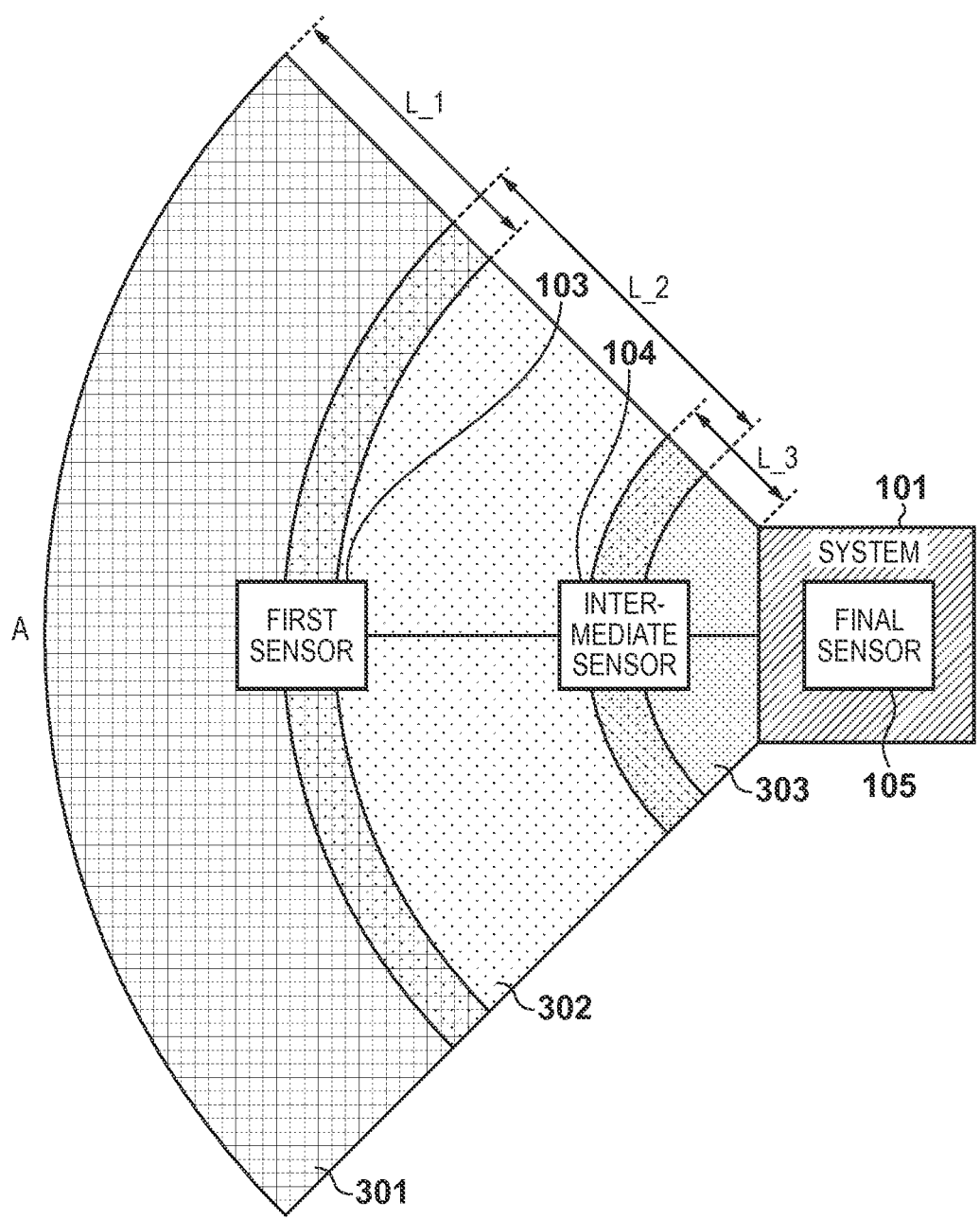
FIG. 3 is a view showing detection ranges of sensors.

FIG. 3 shows detection ranges of the first sensor 103, intermediate sensor 104, and final sensor 105. The detection regions of the sensors are that of the first sensor 103, that of the intermediate sensor 104, and that of the final sensor 105 in an order farther from the image processing apparatus which mounts the detection system 101. A detection region 301 of the first sensor 103 and a detection region 302 of the intermediate sensor 104 partially overlap each other. Also, the detection region 302 of the intermediate sensor 104 and a detection region 303 of the final sensor 105 partially overlap each other.

Figure 4A:
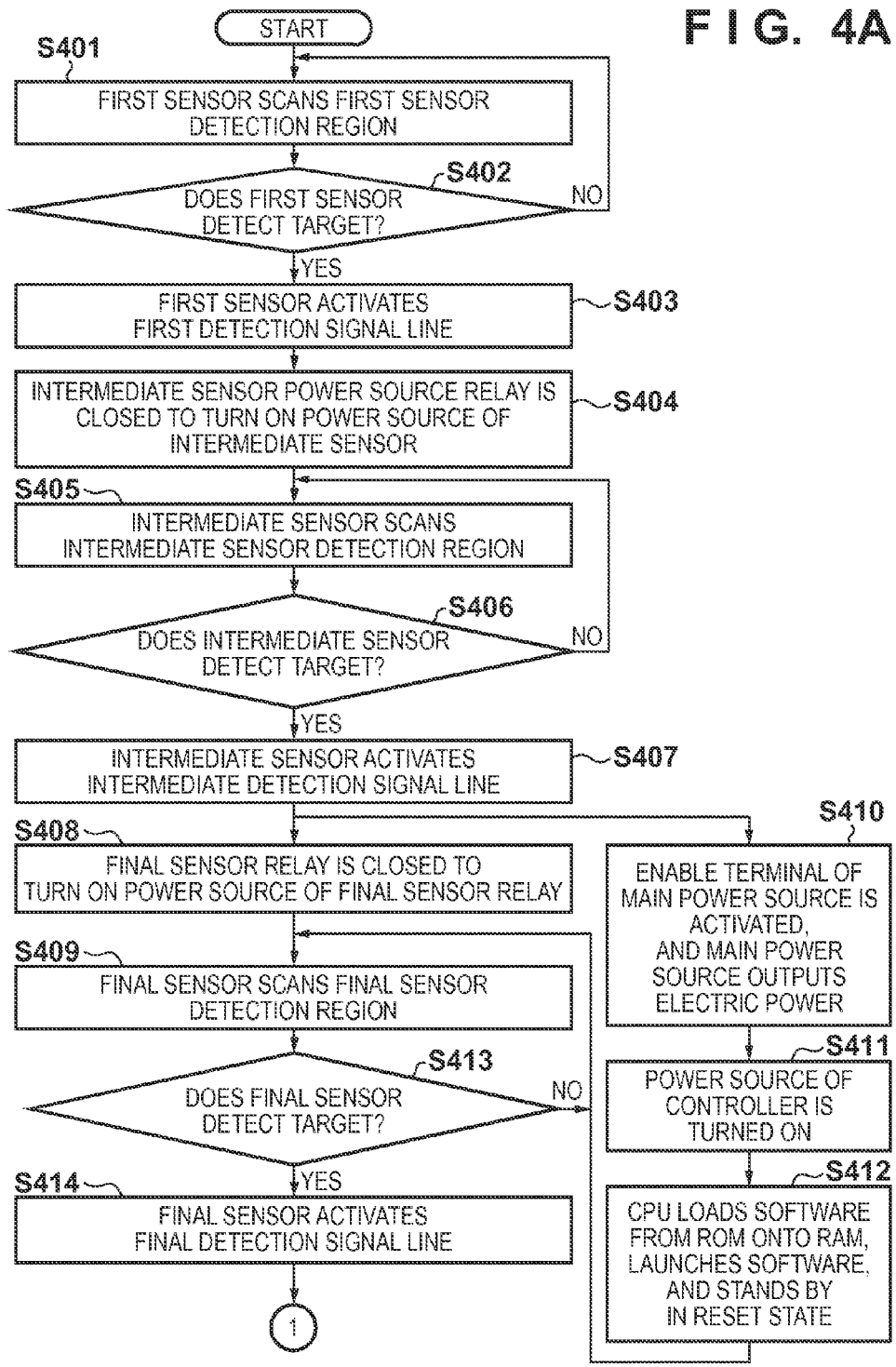
FIGS. 4A and 4B are flowcharts showing the sequence of power control processing executed when a person comes closer according to the first embodiment.
Figure 4B:
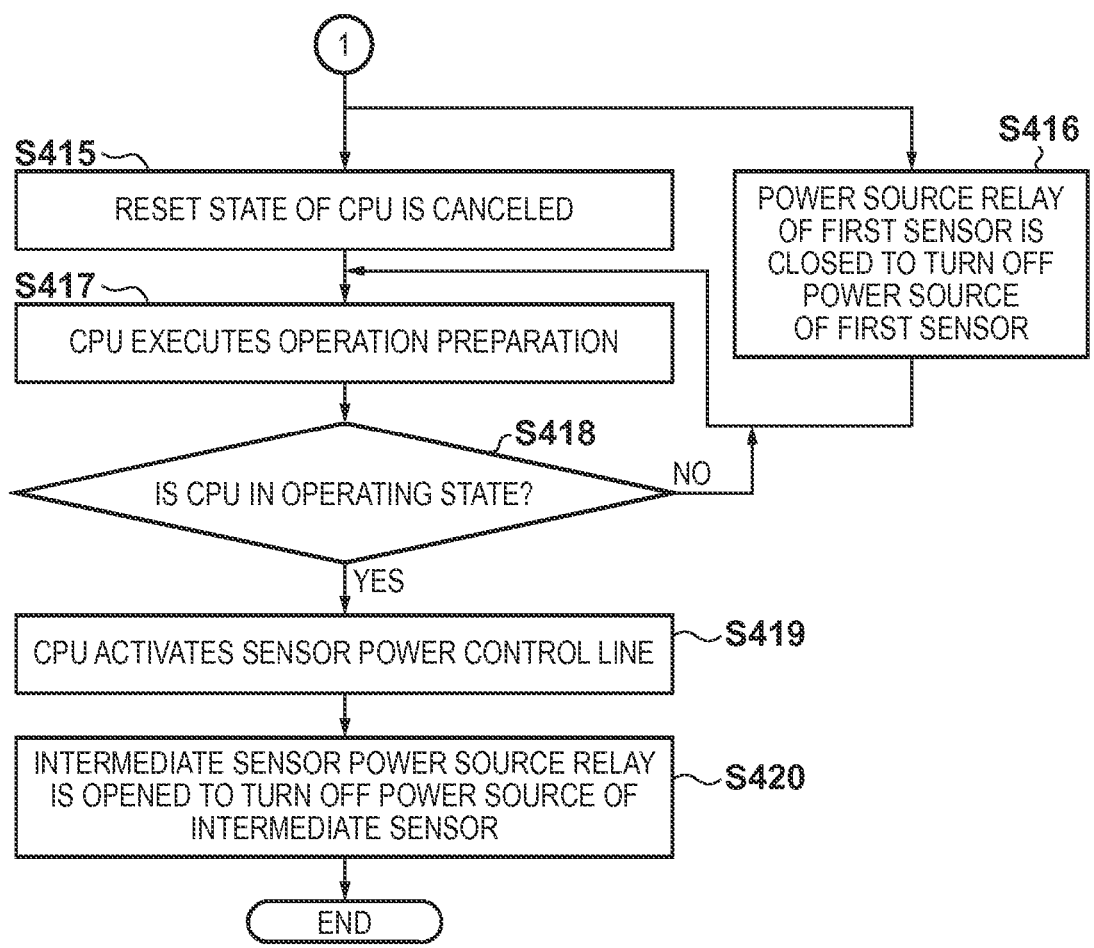
Figure 5A:
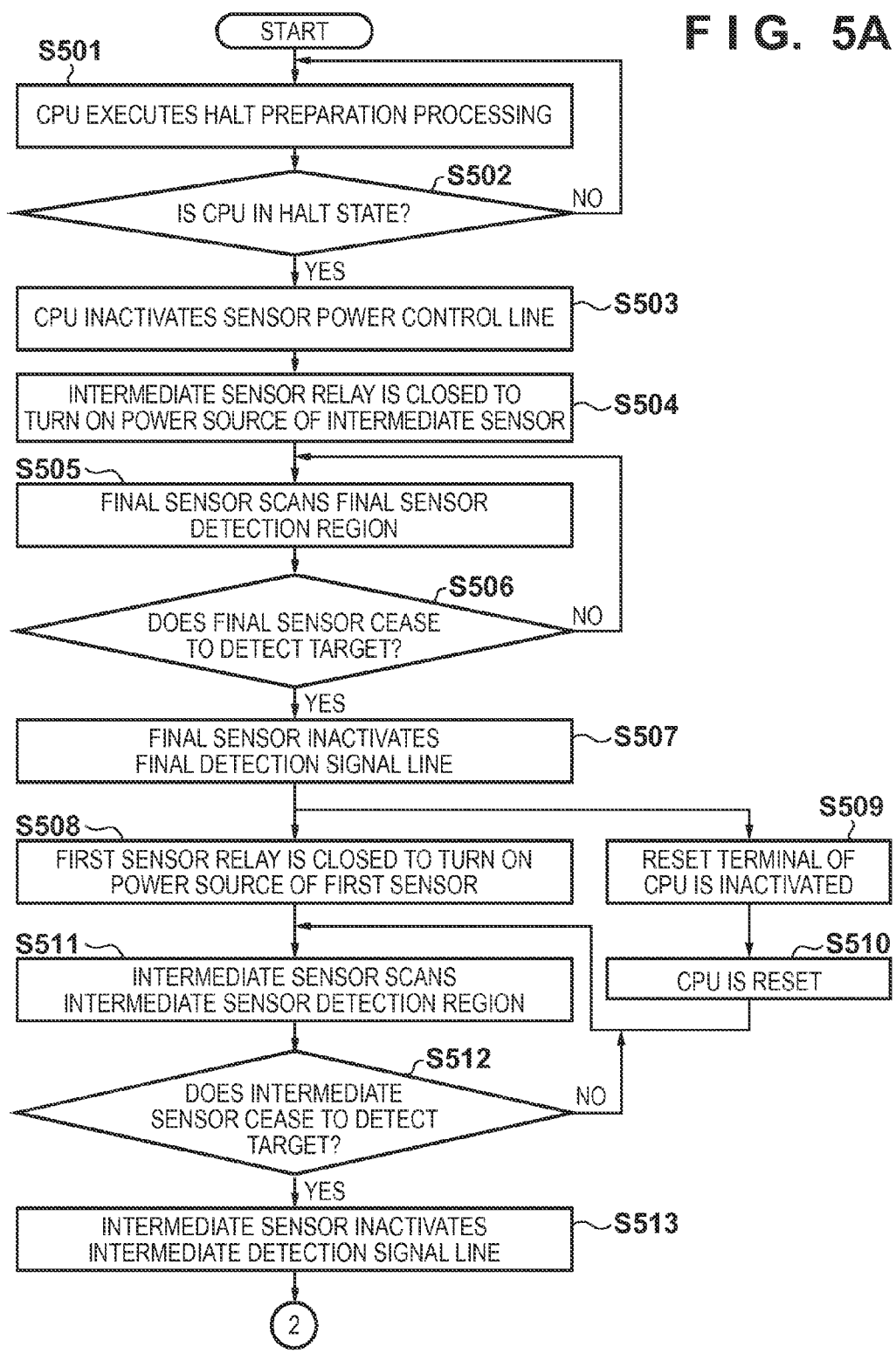
FIGS. 5A and 5B are flowcharts showing the sequence of the power control processing executed when a person moves away.
Figure 5B:
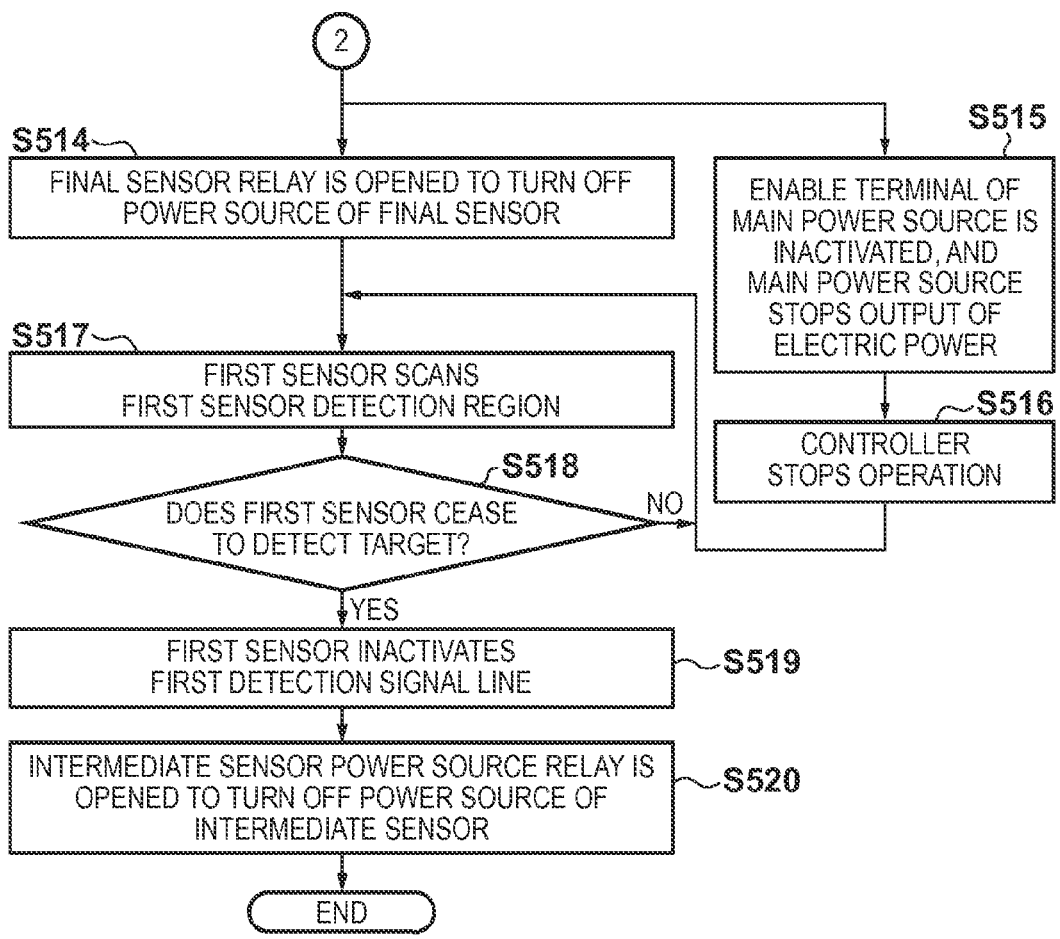

A case will be described first wherein a detection target such as a person comes closer from a point A to the image processing apparatus which mounts the detection system 101. FIGS. 4A and 4B are flowcharts showing the sequence of the power control processing of the detection system 101 when the target comes closer.

In an initial state of the detection system 101, all of the detection signal lines 131, 141, and 151 are inactive. When the main switch 107 is turned on, only a power source of the first sensor 103 is turned on by the main switch 107. As a result, the first sensor 103 starts scanning of a detection target in the detection region 301 (step S401). In this case, the AND circuit 192 activates the enable terminal of the sensor power source relay 132 based on the inverting input of the inactive detection signal 151 and the active output signal line from the main switch 107. Also, since the detection signal lines 131 and 141 are inactive, the enable terminals of the sensor power source relays 142 and 152 are inactive. Therefore, no electric power is supplied to the intermediate sensor 104 and final sensor 105.

In step S402, the first sensor 103 is set in a state of whether or not to detect a detection target. When a detection target at the point A shown in FIG. 3 moves into the detection region 301, and the first sensor 103 detects the detection target (YES in step S402), the first sensor 103 activates the detection signal line 131 (step S403). Note that the processes in step S403 and subsequent steps are executed when the first sensor 103 detects the detection target in step S402.

When the detection signal line 131 is activated, the output of the AND circuit 193 is activated by the active detection signal line 131 and the inactive sensor power control line 124 from the CPU 121, thus activating the enable terminal of the sensor power source relay 142. As a result, the sensor power source relay 142 is closed, and electric power is supplied to the intermediate sensor 104 (step S404). Then, the intermediate sensor 104 starts scanning of a detection target within the detection region 302 (step S405).

In step S406, the intermediate sensor 104 is set in a state of whether or not to detect a detection target. When the detection target moves into the detection region 302, and the intermediate sensor 104 detects the detection target (YES in step S406), the intermediate sensor 104 activates the detection signal line 141 (step S407). Note that the processes in step S407 and subsequent steps are executed when the intermediate sensor 104 detects the detection target in step S406.

When the detection signal line 141 is activated, it activates the enable terminal of the sensor power source relay 152. As a result, the sensor power source relay 152 is closed, and electric power is supplied to the final sensor 105 (step S408). Then, the final sensor 105 starts scanning of a detection target within the detection region 303 (step S409).

Parallel to the aforementioned steps, since the detection signal line 141 activates the enable terminal of the main power source 161, the main power source 161 supplies electric power to the controller 102 (step S410). As a result, the controller 102 is powered (step S411). Since the controller 102 is powered, the CPU 121 autonomously loads data from the ROM 123 onto the RAM 122, executes the loaded data, and stands by in a reset state (step S412).

In step S413, the final sensor 105 is set in a state of whether or not to detect a detection target. When the detection target moves into the detection region 303, and the final sensor 105 detects the detection target (YES in step S413), the final sensor 105 activates the detection signal line 151 (step S414). Note that the processes in step S414 and subsequent steps are executed when the final sensor 105 detects the detection target in step S413.

After the detection signal line 151 is activated, the CPU 121 detects the active detection signal line 151, and cancels the reset state (step S415). Parallel to this step, the output of the AND circuit 192 is inactivated. As a result, the sensor power source relay 132 is opened to cut off power supply to the first sensor 103 (step S416). Note that the detection signal lines of the respective sensors are latched by latch circuits (not shown), as described above. Therefore, even when power supply to the first sensor 103 is cut off, the detection signal line 131 holds the active state.

Next, the CPU 121 executes operation preparation (step S417), and it is determined whether or not the CPU 121 is set in an operating state (step S418). Note that in the operating state, for example, respective functions such as a print function of the image processing apparatus which mounts the detection system 101 are ready to be executed. The processes in step S419 and subsequent steps are executed when it is determined that the CPU 121 is set in the operating state in step S418. If it is determined in step S418 that the CPU 121 is in the operating state, the CPU 121 activates the sensor power control line 124 (step S419). Then, the output of the AND circuit 193 is inactivated. As a result, the sensor power source relay 142 is opened to cut off power supply to the intermediate sensor 104 (step S420).

A case will be described below wherein a detection target moves away from the detection system 101 toward the point A. In this case, the initial state of the detection system 101 is premised on that the processing shown in FIGS. 4A and 4B has already been executed. Therefore, the detection signal lines of all the sensors are latched in an active state.

When the detection target completes use of the print function or the like of the image processing apparatus which mounts the detection system 101, the CPU 121 executes halt preparation processing (step S501) to determine whether or not the apparatus enters a halt state (step S502). Note that in the halt state, for example, neither an external operation nor instruction is input to the image processing apparatus which mounts the detection system 101. In this case, for example, when a state in which no external operation is input continues for a predetermined period of time, the CPU 121 may start halt preparation. The processes of step S503 and subsequent steps are executed when it is determined in step S502 that the apparatus is in the halt state. If it is determined in step S502 that the apparatus is in the halt state, the CPU 121 inactivates the sensor power control line 124 (step S503). As a result, the sensor power source relay 142 is closed to power the intermediate sensor 104 (step S504).

The final sensor 105 scans the detection target in the detection region 303 in step S505, and is set in a state of whether or not to detect the detection target in step S506. When the detection target moves away from the detection region 303 and moves into the detection region 302, and the final sensor 105 ceases to detect the detection target (YES in step S506), the final sensor 105 inactivates the detection signal line 151 (step S507). When the detection signal line 151 is inactivated, the sensor power source relay 132 is closed to power the first sensor 103 (step S508). Parallel to this step, the inactive detection signal line 151 inactivates the reset terminal of the CPU 121 (step S509). As a result, the CPU 121 is reset (step S510).

The intermediate sensor 104 scans the detection target within the detection region 302 in step S511, and is set in a state of whether or not to detect the detection target in step S512. When the detection target moves away from the detection region 302 and moves into the detection region 301, and the intermediate sensor 104 ceases to detect the detection target (YES in step S512), the intermediate sensor 104 inactivates the detection signal line 141 (step S513). Since the detection signal line 141 is inactivated, the sensor power source relay 152 is opened to cut off power supply to the final sensor 105 (step S514). Parallel to this step, the enable terminal of the man power source 161 is inactivated, and the main power source 161 stops power supply to the controller 102 (step S515). As a result, the controller 102 stops its operation (step S516). As described above, since the sensors 103 to 105 have latch circuits (not shown), the detection signal line 151 and sensor power control line 124 are held inactive.

The first sensor 103 scans the detection target in the detection region 301 in step S517, and is set in a state of whether or not to detect the detection target in step S518. When the detection target moves away from the detection region 301 and moves to the point A, and the first sensor 103 ceases to detect the detection target (YES in step S518), the first sensor 103 inactivates the detection signal line 131 (step S519). Since the detection signal line 131 is inactivated, the sensor power source relay 142 is opened to cut off power supply to the intermediate sensor 104 (step S520). Also, by latch circuits (not shown), the detection signal line 141 is held inactive.

FIG. 6 is a table showing the relationship between the positions of the detection target and power-on states of the sensors 103 to 105 and controller 102. FIG. 6 shows a state in which the power-on states of the sensors 103 to 105 and controller 102 are sequentially switched according to the positions of the detection target. For example, as the detection target comes from the point A closer to the detection system 101, power-on blocks gradually transition from the first sensor 103 alone in the power-on state until the power-on state of the controller 102. The same applies to a case in which the detection target moves away from the detection system 101 toward the point A.

As described above, according to this embodiment, electric power can be supplied to only sensors involved in detection depending on the location of the detection target. In this embodiment, sensors independently control power sources of other sensors. For this reason, the CPU 121 need not be in an operating state for sensor power control. Furthermore, since only the detection signal line 151 of the final sensor 105 is connected to the reset terminal of the CPU 121, I/O ports of the CPU 121 as many as the number of sensors need not be assured unlike in the related art when a plurality of sensors are arranged.

Also, this embodiment has explained the three types of sensors, that is, the first sensor 103, intermediate sensor 104, and final sensor 105. However, even when the number of intermediate sensors 104 is increased, the control of the intermediate sensor 104 of this embodiment is repetitively executed to implement the same processes shown in FIGS. 4 and 5.

Second Embodiment

The first embodiment has explained the case in which a power source of a controller 102 is OFF in an initial state, and a CPU 121 begins to operate as a detection target comes closer to an image processing apparatus which mounts a detection system 101. However, even when the controller 102 stands by in a power saving state, the processes of FIGS. 4 and 5 are applicable. Differences from the first embodiment will be described below in association with a case in which the controller 102 stands by in the power saving state.

FIG. 7 is a block diagram showing the arrangement of the detection system 101 according to this embodiment. Unlike in FIG. 1, a power supply line from a sub power source 162 is also supplied to the CPU 121. Connection of the power supply line to the CPU 121 is indicated by a power supply line 701 in FIG. 7. In this embodiment, when the controller 102 stands by in the power saving state, electric power is supplied from a sub power source 162 via the power supply line 701. On the other hand, when the controller 102 transitions to a normal operation state, electric power is supplied from the main power source 161.

Figure 8A:
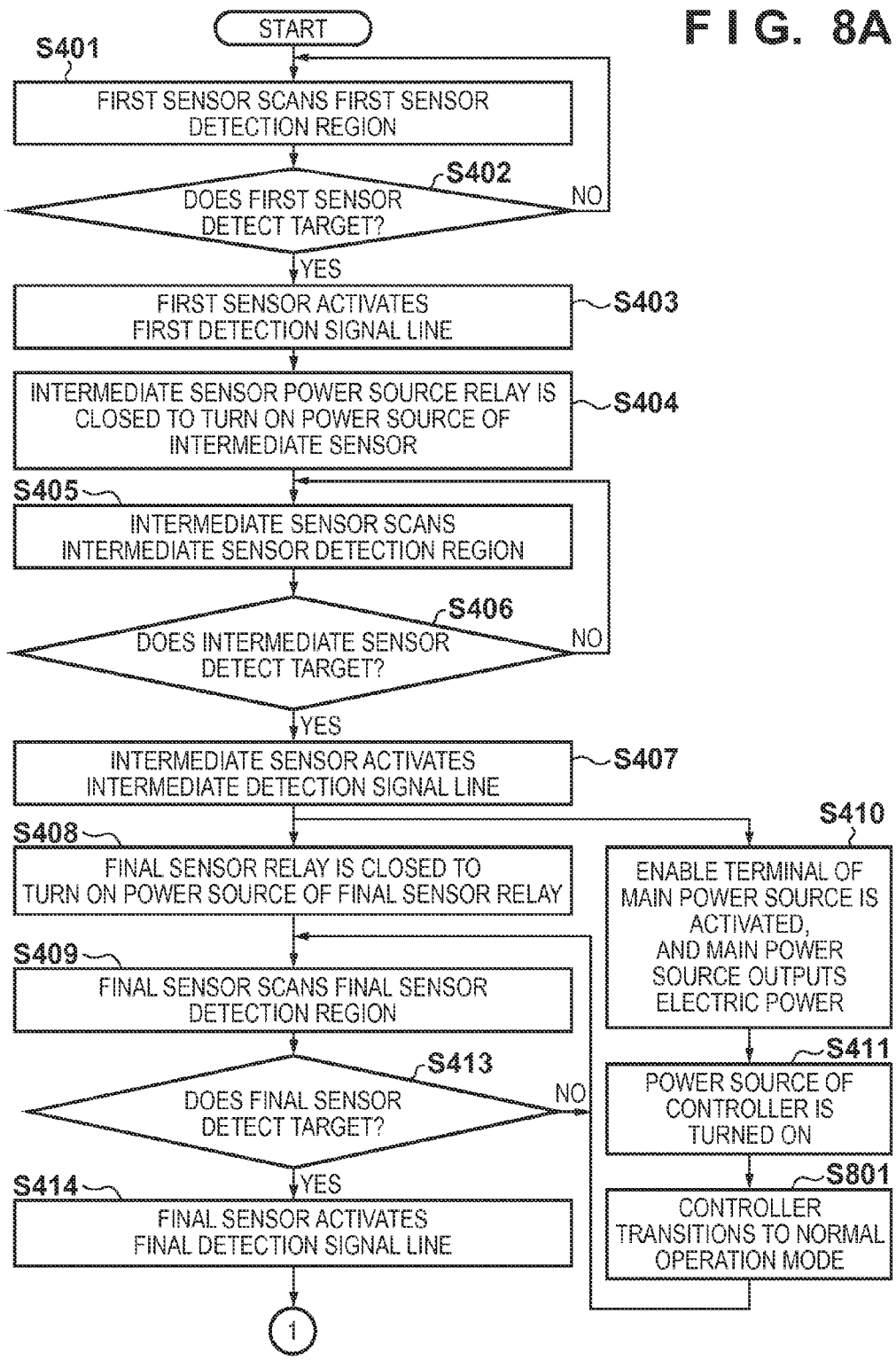
FIGS. 8A and 8B are flowcharts showing the sequence of power control processing executed when a person comes closer according to the second embodiment.
Figure 8B:
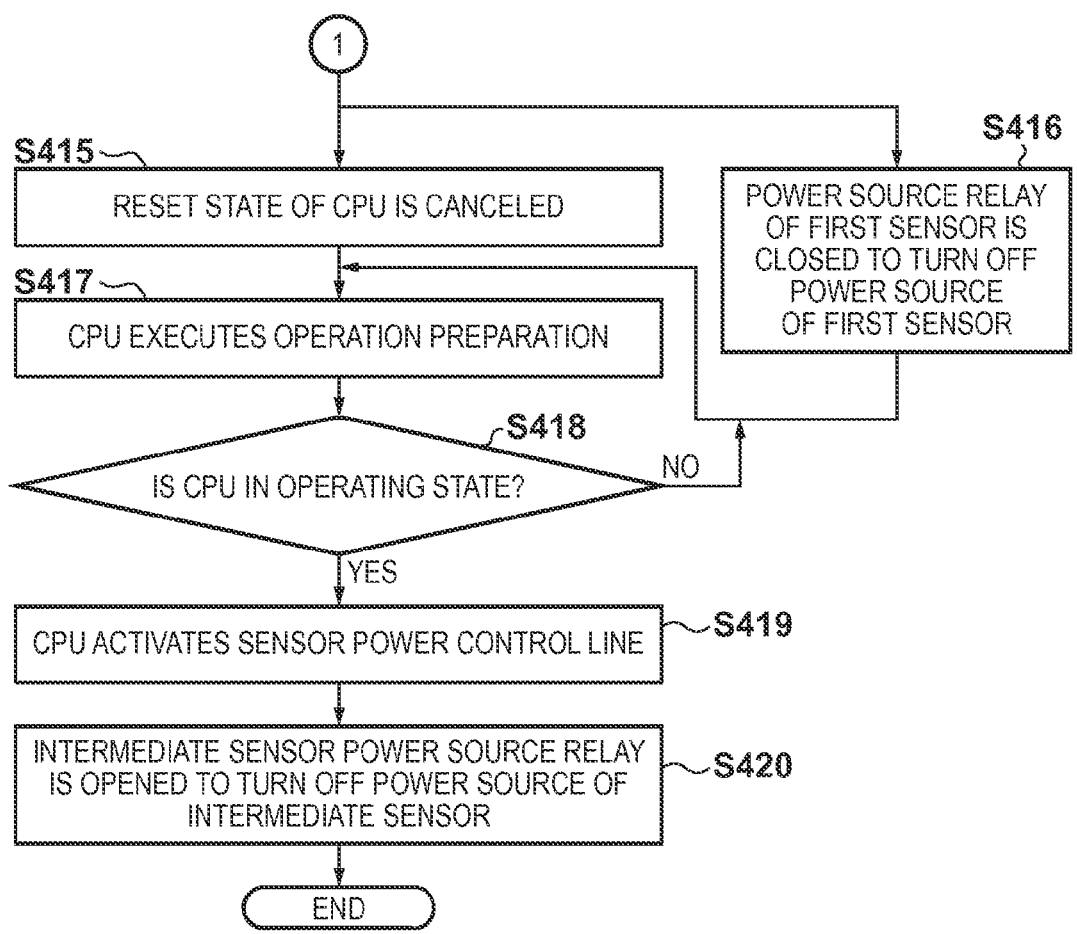

Power control processing in the detection system 101 which includes a plurality of sensors and the controller 102 having the power saving state will be described below with reference to FIGS. 3, 7, 8A, 8B, 9A and 9B. A case will be explained first wherein a detection target comes from a point A closer to the detection system 101. FIGS. 8A and 8B are flowcharts showing the sequence of the power control processing executed when the detection target comes from the point A closer to the detection system 101. FIGS. 8A and 8B are different from FIGS. 4A and 4B in that step S801 is executed after step S411.

When the detection target moves from a detection region 301 to a detection region 302, and an intermediate sensor 104 detects the detection target (YES in step S406), a detection signal line 141 activates an enable terminal of the main power source 161. Then, the main power source 161 supplies electric power to the controller 102 (step S410). As a result, electric power is supplied from the main power source 161 to the controller 102 (step S411), and the controller 102 transitions from the power saving state to the normal operation state (step S801).

Figure 9A:
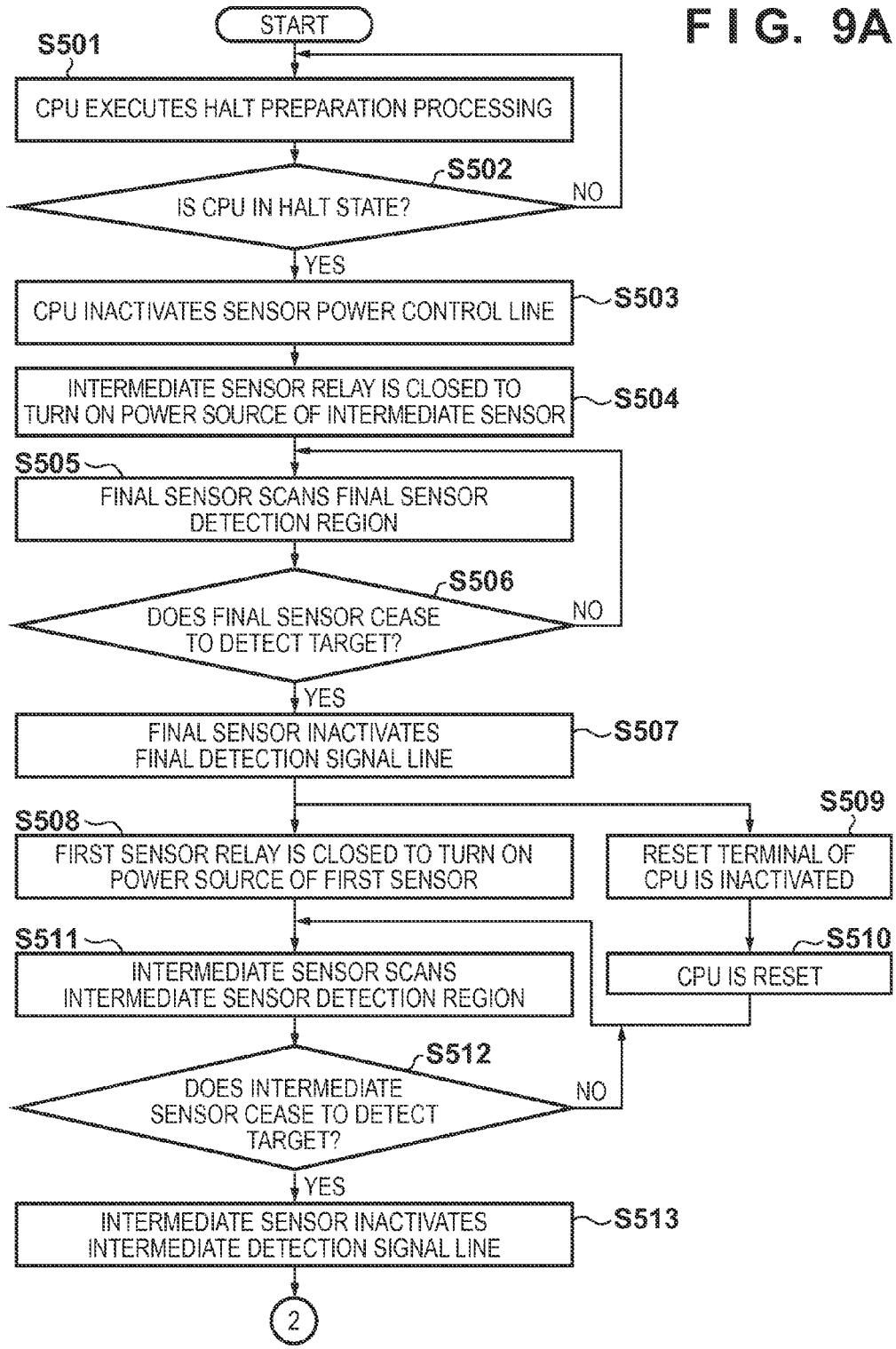
FIGS. 9A and 9B are flowcharts showing the sequence of the power control processing executed when a person moves away.
Figure 9B:
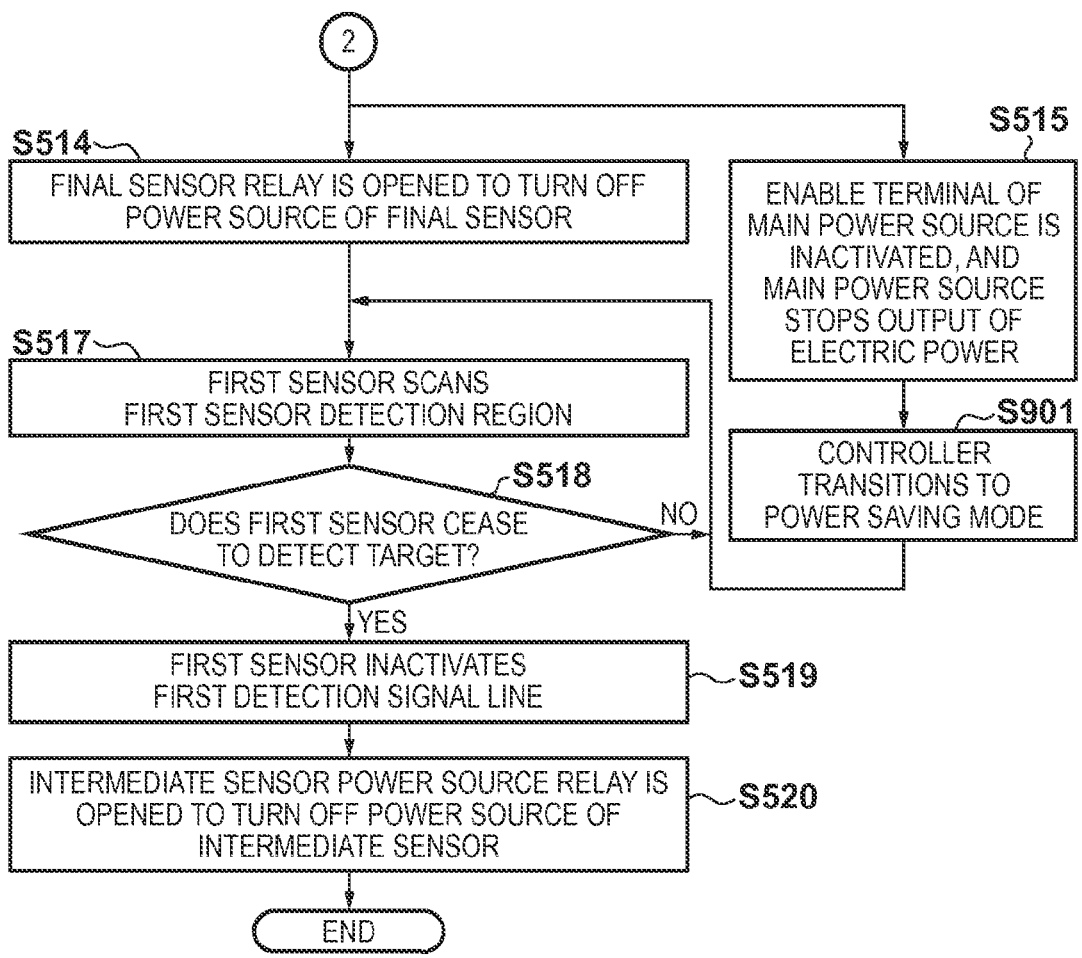

A case will be described below wherein the detection target moves away from the detection system 101 toward the point A. FIGS. 9A and 9B are flowcharts showing the sequence of the power control processing executed when the detection target moves away from the detection system 101 toward the point A. FIGS. 9A and 9B are different from FIGS. 5A and 5B in that step S901 is executed after step S515.

That is, when the detection target is located within the detection regions 303 and 302, the same processing as in the first embodiment is executed. When the detection target further moves into the detection region 301, and the intermediate sensor 104 ceases to detect the detection target (YES in step S512), the intermediate sensor 104 inactivates the detection signal line 141 to stop power supply from the main power source 161 (step S515). As a result, since electric power is supplied from only the sub power source 162 to the controller 102, the controller 102 autonomously transitions to the power saving state (step S901).

As described above, according to this embodiment, even when the controller 102 has the power saving state, only sensors involved in detection of the detection target can be powered.

FIG. 10 is a table showing the relationship between the positions of the detection target and power-on states of the sensors 103 to 105 and controller 102. FIG. 10 shows a state in which the power-on states of the sensors 103 to 105 and controller 102 are sequentially switched according to the positions of the detection target. For example, when the detection target comes closer to the detection system 101, the controller 102 is switched from the power saving state to the normal operation state when the detection target is located within the detection region 302.

As described in the first and second embodiments, since the sensors execute power control of other sensors upon movement of the detection target, electric power can be supplied to only required sensors, thus reducing the power consumption of the overall detection system. Also, since the sensors execute power control of other sensors, power control output ports for all the sensors need not be assured for the CPU, and the number of ports of the CPU can be saved. Furthermore, since the CPU is not involved in power control of all the sensors, the power consumption of the CPU can be suppressed to be as low as possible.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-055418, filed Mar. 18, 2013, which is hereby incorporated by reference herein in its entirety.

What is claimed is:

1. An electronic device comprising:
    a first sensor;
    a second sensor;
    a third sensor; and
    a controller which includes one or more processors,
    wherein:
        (i) the second sensor is turned on based on a detection result of the first sensor,
        (ii) the third sensor is turned on based on a detection result of the second sensor, and
        (iii) the first sensor is turned off based on a detection result of the third sensor, and
    wherein the controller is returned to a first power mode from a second power mode, in which power consumption is lower than power consumption of the first power mode, based on a detection result of the second sensor.

2. The device according to claim 1, further comprising:
    a power supply configured to output power to the controller,
    wherein the power supply outputs power to the controller based on the detection result of the second sensor.

3. The device according to claim 1, wherein the second sensor is turned off after the controller is returned to the first power mode from the second power mode.

4. The device according to claim 3, wherein the third sensor is constructed to output a reset signal to the controller;
    wherein the third sensor stops outputting the reset signal based on the detection result of the third sensor.

5. The device according to claim 1, further comprising:
    a switch which is connected to the second sensor and which is able to be turned on or off,
    wherein the switch is turned on based on the detection result of the first sensor.

6. A power control method for an electronic device that includes a first sensor, a second sensor, a third sensor, and a controller that includes one or more processors, the method, performed by the controller, comprising:
    turning on the second sensor based on a detection result of the first sensor;
    turning on a third sensor based on a detection result of the second sensor;
    turning off the first sensor based on the detection result of the third sensor; and
    wherein the controller is returned to a first power mode from a second power mode, in which power consumption is lower than power consumption of the first power mode, based on the detection result of the second sensor.

7. The device according to claim 1, further comprising:
    a switch which is connected to the third sensor and which is able to be turned on or off,
    wherein the switch is turned on based on the detection result of the second sensor.

8. The device according to claim 1, wherein the first sensor has a first detection region, the second sensor has a second detection region which is smaller than the first detection region, and the third sensor has a third detection region which is smaller than the second detection region.

9. The device according to claim 2, wherein the controller further includes a ROM and a RAM,
    wherein, in a case where the power is outputted from the power supply, the one or more processors read data from the ROM, load the read data into the RAM, and then stand by in a reset state.

10. The device according to claim 9, wherein a reset state is cancelled based on the detection result of the third sensor.

11. The device according to claim 1, wherein at least one of the first sensor, the second sensor, and the third sensor is a pyroelectric sensor.

12. The device according to claim 1, wherein at least one of the first sensor, the second sensor, and the third sensor outputs and receives infrared light.

13. The method according to claim 6, further comprising:
outputting power from a power supply to the controller based on the detection result of the second sensor.

14. The method according to claim 6, further comprising:
turning off the second sensor when the controller is returned to the first power mode from the second power mode.

15. The method according to claim 14, further comprising:
outputting a reset signal from the third sensor to the controller,
wherein the third sensor stops outputting the reset signal based on the detection result of the third sensor.

16. The method according to claim 6, further comprising:
turning on a switch connected to the second sensor based on the detection result of the first sensor.

17. The method according to claim 6, further comprising:
turning on a switch connected to the third sensor based on the detection result of the second sensor.

18. The method according to claim 6, wherein the first sensor has a first detection region, the second sensor has a second detection region which is smaller than the first detection region, and the third sensor has a third detection region which is smaller than the second detection region.

19. The method according to claim 13, further comprising:
reading data from ROM included in the controller;
loading the read data from the ROM into RAM included in the controller; and
causing the controller to stand by in a reset state.

* * * * *